US00RE45693E

(19) United States
(12) Reissued Patent
Minamide

(10) Patent Number: US RE45,693 E
(45) Date of Reissued Patent: Sep. 29, 2015

(54) POSITION CONTROL APPARATUS

(71) Applicant: OKUMA Corporation, Niwa-gun, Aichi (JP)

(72) Inventor: Masaya Minamide, Niwa-Gun (JP)

(73) Assignee: OKUMA Corporation, Niwa-gun, Aichi (JP)

(21) Appl. No.: 13/735,624

(22) Filed: Jan. 7, 2013

Related U.S. Patent Documents

Reissue of:
(64) Patent No.: 7,982,425
Issued: Jul. 19, 2011
Appl. No.: 12/479,356
Filed: Jun. 5, 2009

(30) Foreign Application Priority Data

Jun. 10, 2008 (JP) ..... 2008-151356

(51) Int. Cl.
*G05D 23/275* (2006.01)
*G05B 19/404* (2006.01)

(52) U.S. Cl.
CPC .... *G05B 19/404* (2013.01); *G05B 2219/41084* (2013.01); *G05B 2219/49182* (2013.01)

(58) Field of Classification Search
CPC ..... G05B 19/404; G05B 19/408
USPC ..... 318/560, 632, 65, 280, 282, 286
See application file for complete search history.

(56) References Cited

U.S. PATENT DOCUMENTS 4,258,299 A * 3/1981 Takeda et al. ..... 318/258
5,517,100 A * 5/1996 Matsubara et al. ..... 318/632

(Continued)

FOREIGN PATENT DOCUMENTS

JP 6-73798 9/1994

OTHER PUBLICATIONS esp@cenet patent abstract for Japanese Publication No. 1234136, Publication date Sep. 19, 1989 (Corresponds to JP6-73798).

*Primary Examiner* — Minh Nguyen
(74) *Attorney, Agent, or Firm* — Osha Liang LLP

(57) ABSTRACT

A position control apparatus includes a reverse displacement calculation unit configured to calculate a reverse displacement that represents an amount of movement made from a preceding reverse point to a current reverse point by an axis that performs a reversing motion; a [reversing-time segmenting number] *number of consecutive occurrences of reversing motions* calculation unit configured to compare the reverse displacement to a predetermined value, and, when the reverse displacement is less than the predetermined value, increase a value of [a reversing-time segmenting] number *of consecutive occurrences of reversing motions*, [which is a coefficient indicating a number of segments per unit time during a reversing motion,] and, when the reverse displacement is greater than or equal to the predetermined value, decrease the value of the [reversing-time segmenting number] *number of consecutive occurrences of reversing motions*; and a quadrant inversion compensation unit configured to automatically adjust a quadrant inversion compensation amount according to the [reversing-time segmenting number] *number of consecutive occurrences of reversing motions* and perform the quadrant inversion compensation based on the automatically adjusted compensation amount.

2 Claims, 7 Drawing Sheets

(Amended)

(56) References Cited

U.S. PATENT DOCUMENTS 5,602,449 A * 2/1997 Krause et al. ..... 318/400.09
5,801,501 A * 9/1998 Redelberger ..... 318/283
6,624,603 B2 * 9/2003 Preymann ..... 318/281
7,274,161 B2 * 9/2007 Mori et al. ..... 318/400.36
7,307,395 B2 * 12/2007 Bouamra et al. ..... 318/445

* cited by examiner

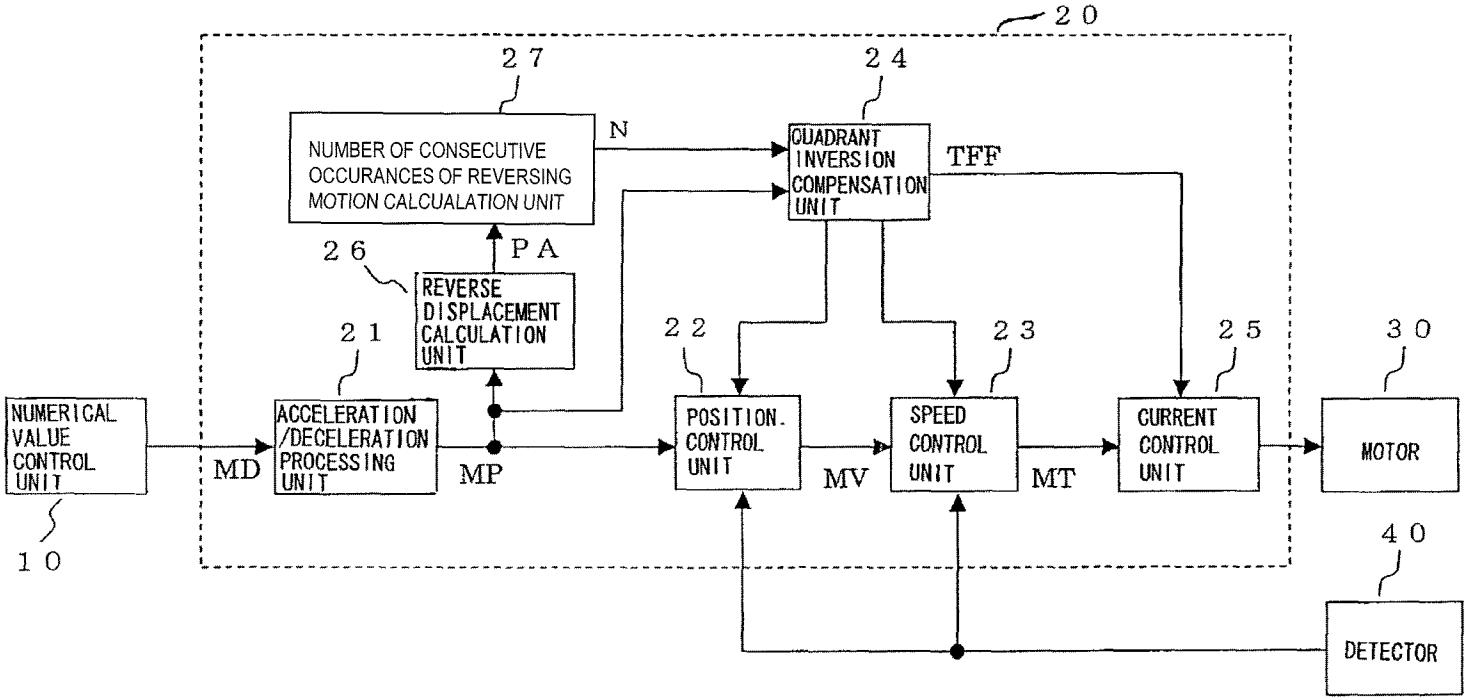
FIG. 1
(Amended)

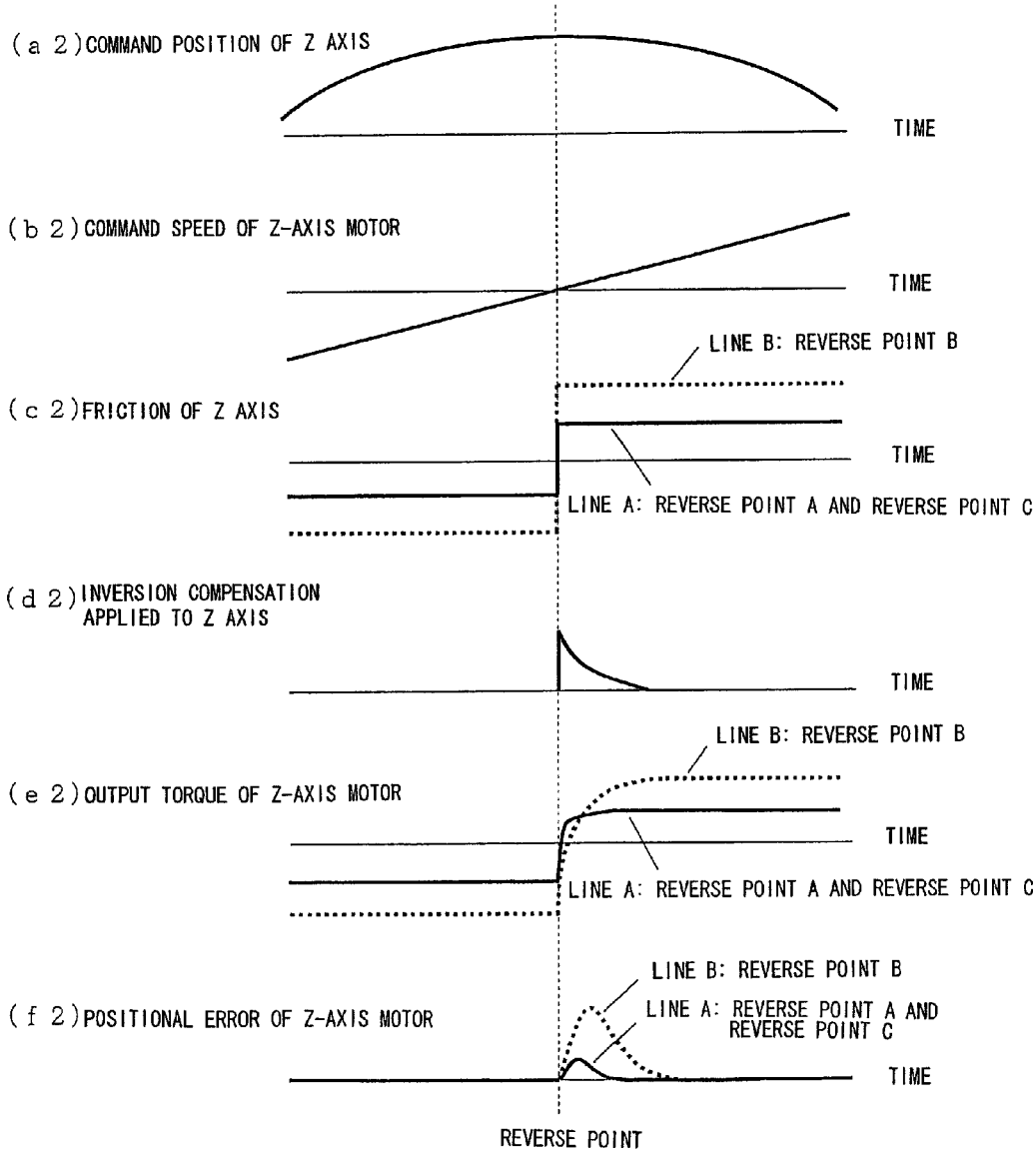
(PRIOR ART) FIG. 7

POSITION CONTROL APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to Japanese Patent Application No. 2008-151356, filed on Jun. 10, 2008, which is incorporated herein by reference in its entirety.

BACKGROUND OF THE INVENTION

1. Field of the Invention

The present invention relates to a position control apparatus that performs quadrant inversion compensation when the moving direction of an axis of a machine is reversed.

2. Description of the Related Art

First, general quadrant inversion compensation is described below with reference to FIG. 4. FIG. 4 illustrates variations in command position of a Z axis (a1), command speed of a Z-axis motor (b1), friction of the Z axis (c1), inversion compensation applied to the Z axis (d1), output torque of the Z-axis motor (e1), and positional error of the Z-axis motor (f1) in a case where the moving direction of the Z axis of a machine tool is reversed. As illustrated in (b1), when the moving direction of the Z axis is reversed at a reverse point during a machining operation, the sign of the motor command speed is reversed at the reverse point.

At that point, as illustrated in (c1), the friction of the machine changes abruptly at the moment that the sign changes at the reverse point. If, in response to such a change in the friction of the machine, the apparatus performs only the feedback control to control the motor position, i.e., if the apparatus does not perform quadrant inversion compensation, the motor output torque cannot sufficiently deal with the friction change of the machine, as indicated by a line A of (e1). As a result, a large tracking delay occurs, as indicated by a line A of (f1), and the shape of a processed product may be unsatisfactory.

To attempt to deal with this problem, typical position control apparatuses are today able to appropriately perform quadrant inversion compensation to deal with a change in the frictional force that may occur when the moving direction of an axis is reversed. For example, an apparatus may be able perform torque compensation (TFF) defined by a TFF amount and a TFF continuation time illustrated in (d1). Such torque compensation (TFF) enables the motor output torque to respond quickly as indicated by a line B of (e1) and can reduce the tracking delay in a reversing operation as indicated by a line B of (f1). As a result, a product having a satisfactory shape can be obtained.

FIG. 5 is a block diagram illustrating an example of a conventional position control apparatus that can perform quadrant inversion compensation. The position control apparatus illustrated in FIG. 5 includes a numerical value control unit 10, a motor control unit 20, a motor 30, and a detector 40. The motor control unit 20 includes an acceleration/deceleration processing unit 21, a position control unit 22, a speed control unit 23, a quadrant inversion compensation unit 24, and a current control unit 25.

The numerical value control unit 10 can generate a target position command MD based on the content of an input machining (or processing) program. The acceleration/deceleration processing unit 21 generates an internal position command value MP for the motor control unit 20 based on the target position command MD received from the numerical value control unit 10 and a predetermined acceleration/deceleration time. The position control unit 22 generates a speed command value MV based on the position command value MP received from the acceleration/deceleration processing unit 21 and a position detection value received from the detector 40. The position control unit 22 performs position feedback control based on the position detection value received from the detector 40.

The speed control unit 23 generates a torque command value MT based on the speed command value MV received from the position control unit 22 and a differential value of the position detection value received from the detector 40. The speed control unit 23 performs speed feedback control based on the position detection value received from the detector 40. The quadrant inversion compensation unit 24 generates a quadrant inversion compensation TFF if a reversion of the moving direction is detected based on the internal position command value MP sent from the acceleration/deceleration processing unit 21.

The current control unit 25 generates a current command based on the torque command value MT received from the speed control unit 23 and the quadrant inversion compensation TFF received from the quadrant inversion compensation unit 24. Current flows through the motor 30 according to the current command supplied from the current control unit 25, to drive the motor 30. In another embodiment, the quadrant inversion compensation TFF generated by the quadrant inversion compensation unit 24 may serve as a position command compensation amount that can be input to the position control unit 22, or may serve as a speed command compensation amount that can be input to the speed control unit 23.

FIG. 6 illustrates an example shape of a workpiece that may be processed by a machine tool. For example, to process the workpiece illustrated in FIG. 6, a milling tool moves from a start point (located at a lower left position) to an end point (located at an upper left position) along arrows illustrated in the drawing. A dotted line connecting three points A, B, and C indicate reverse positions where the Z axis causes a reversing motion in a manner similar to the operation described with reference to the example illustrated in FIG. 4. The moving amount of the Z axis in a region from the start point to the intermediate point is about 10 mm. The moving amount of the Z axis in a region from the intermediate point to the end point is about 40 mm.

An example of type of position control that can be performed by a conventional apparatus is described below with reference to FIG. 7. FIG. 7 illustrates variations in command position of the Z axis (a2), command speed of the Z-axis motor (b2), friction of the Z axis (c2), inversion compensation applied to the Z axis (d2), output torque of the Z-axis motor (e2), and positional error of the Z-axis motor (f2) in a case where the workpiece illustrated in FIG. 6 is processed. The shape of the workpiece illustrated in FIG. 6 is uniform at the reverse point A, the reverse point B, and the reverse point C. Therefore, the command position of the Z axis (a2) and the command speed of the Z-axis motor (b2) at the reverse point A, the reverse point B, and the reverse point C are similar to each other. On the other hand, the friction of the Z axis (c2) is similar between the reverse point A and the reverse point C as indicated by a line A. However, the friction of the Z axis (c2)

at the reverse point B is larger than the frictions at the reverse point A and the reverse point C as indicated by a line B.

In a conventional position control apparatus as described, the inversion compensation amount (d2) is set to be a same value at the reverse point A, the reverse point B, and the reverse point C. Therefore, the output torque of the Z-axis motor at the reverse point B cannot respond sufficiently quickly and may be delayed compared to the friction of the Z axis as indicated by a line B of (e2). The positional error of the Z-axis motor at the reverse point B becomes larger than the errors at the reverse point A and the reverse point B as indicated by a line B of (f2).

It is believed that the above-described problem occurs due to the relative shortness (i.e., approximately 10 mm) of the moving amount of the Z axis in the region from the start point to the intermediate point. For example, in a case where a sliding guide is provided on a Z-axis guide surface, if the Z axis makes reversing motions repetitively in a state where the moving distance of the Z axis is shorter than the pitch of an oil groove, the oil on the guide surface reduces and the friction of the Z axis may increase. Furthermore, if the Z axis makes reversing motions repetitively in a state where the moving distance of the Z axis is shorter than a lead pitch of a ball screw, the ball screw may not roll smoothly and the friction of the Z axis may increase. However, such an increase in the friction does not occur if the Z axis moves a distance sufficiently larger than the above-described oil groove pitch or the lead pitch.

Therefore, both the friction and the positional error increase at the reverse point B. However, if the Z axis passes through the intermediate point and reaches the reverse point C at which the Z-axis moving amount is approximately 40 mm, characteristics of the Z axis at the reverse point C becomes similar to those at the reverse point A.

In an attempt to solve the above-described problem, a conventional method disclosed in the Japanese Patent Application Laid-Open No. 6-73798 includes steps of calculating a friction based on a motor output torque and correcting a value for inversion compensation based on the calculated friction. However, because the output torque generally includes various types of torques, such as a frictional torque, an acceleration/deceleration torque, a cutting torque, a weight holding torque, and others, accurately calculating only the frictional torque based on a load torque can be problematic, or even impossible. Accordingly, the conventional method cannot accurately correct an inversion compensation amount, and the positional error of the Z-axis motor may become even larger than it would have been had no correction been performed.

SUMMARY OF THE INVENTION

As described above, conventional position control apparatuses cannot reliably perform quadrant inversion compensation in response to an increase in the friction if an axis makes reversing motions repetitively and the moving distance from one reverse point to another reverse point is short. This causes an increase in the positional error. A finished surface of a processed product may be unsatisfactory.

The present invention solves the above-described problem and provides a machine that can consistently reduce tracking error, irrespective of the shape of a workpiece to be processed.

To attain the above-described object, a position control apparatus according to the present invention performs quadrant inversion compensation when the moving direction of a machine is reversed. The position control apparatus includes a reverse displacement calculation unit configured to calculate a reverse displacement that represents an amount of movement made from a preceding reverse point to a current reverse point of by an axis that performs a reversing motion; a [reversing-time segmenting number] *number of consecutive occurrences of reversing motions* calculation unit configured to compare the reverse displacement with a predetermined value and also configured to increase a value of a [reversing-time segmenting number] *number of consecutive occurrences of reversing motions*, [which is a coefficient indicating a number of segments per unit time during a reversing motion,] if the reverse displacement is smaller than the predetermined value, and decease the value of the [reversing-time segmenting number] *number of consecutive occurrences of reversing motions* if the reverse displacement is equal to or greater than the predetermined value, and a quadrant inversion compensation unit configured to automatically adjust a quadrant inversion compensation amount according to the reversing-time segmenting number and perform the quadrant inversion compensation based on the automatically adjusted compensation amount.

The quadrant inversion compensation according to the present invention can appropriately correct the inversion compensation amount according to the [reversing-time segmenting number] *number of consecutive occurrences of reversing motions* when the machine makes reversing motions repetitively and the moving amount from one reverse point to another reverse point is too short to decrease the friction. Therefore, the position control apparatus according to the present invention can prevent generation of correction errors caused by external factors, and can perform continuous optimum quadrant inversion compensation. As a result, a processing machine according to the present invention can perform the processing accurately and without causing any significant tracking error.

BRIEF DESCRIPTION OF THE DRAWINGS

The accompanying drawings, which are incorporated in and constitute a part of the specification, illustrate an embodiment of the invention and, together with the description, serve to explain the principles of the invention, in which:

FIG. 1 is a block diagram illustrating an example of a position control apparatus according to an embodiment of the present invention;

FIG. 7 illustrates problems in the conventional apparatus.

DESCRIPTION OF PREFERRED EMBODIMENTS

A best mode for carrying out the claimed invention (hereinafter, referred to as "embodiment") is described below with reference to the drawings.

Figure 5:
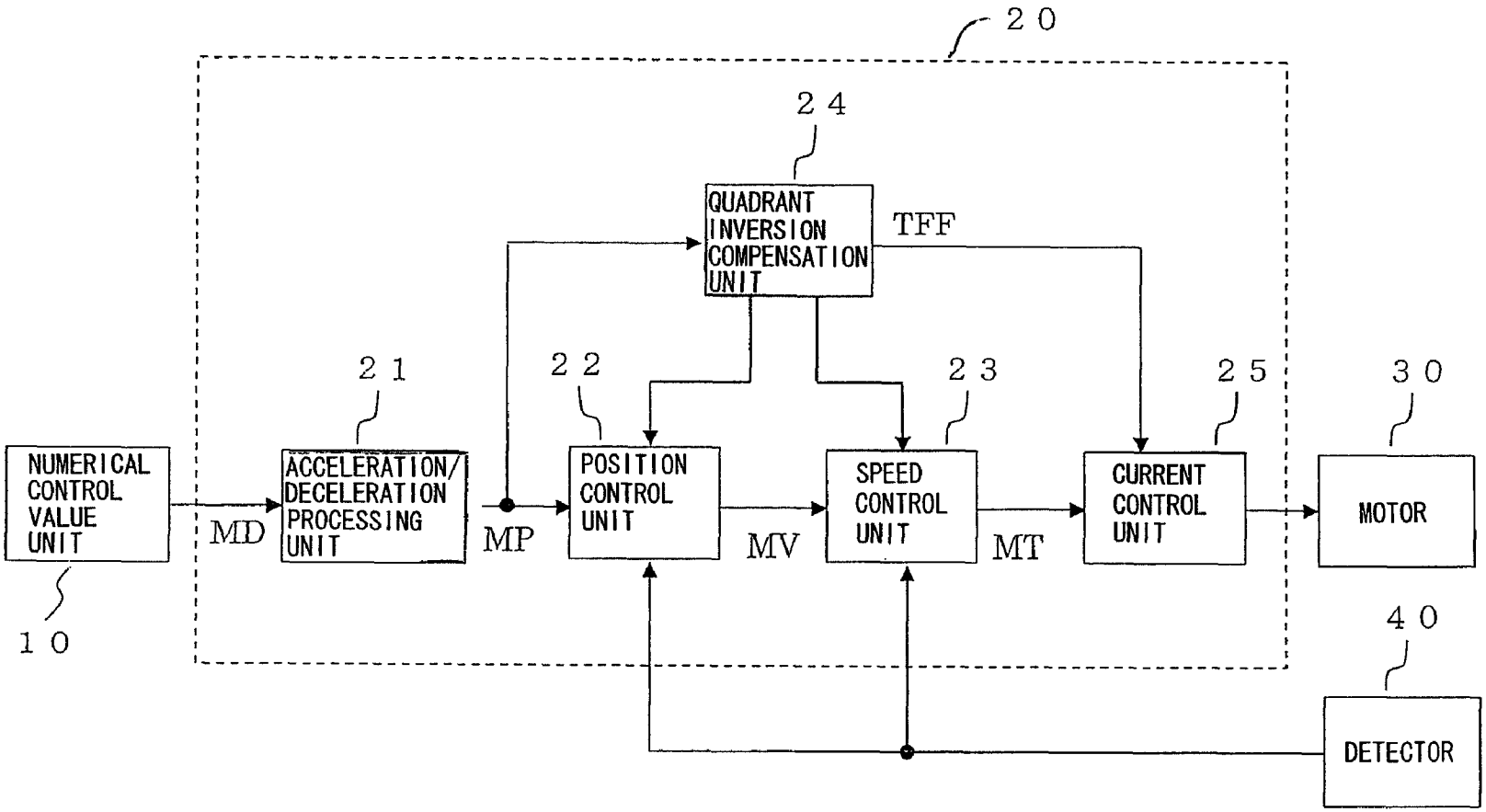
FIG. 5 is a block diagram illustrating an example of a conventional apparatus.

FIG. 1 is a block diagram illustrating an example of a position control apparatus according to an embodiment of the present invention. In FIG. 1, constituent components and signals similar to those illustrated in FIG. 5 are denoted by the same reference numerals and their descriptions are not repeated. The position control apparatus according to the present embodiment includes a reverse displacement calculation unit 26 and a [reversing-time segmenting number] *number of consecutive occurrences of reversing motions* calculation unit 27 that are newly added. The reverse displacement calculation unit 26 can calculate a moving amount PA based on a position command MP that can be transmitted from the acceleration/deceleration processing unit 21. The moving amount PA represents a moving distance from a preceding inversion point to the present inversion point. The reverse displacement calculation unit 26 can further send the calculated moving amount PA to the [reversing-time segmenting number] *number of consecutive occurrences of reversing motions* calculation unit 27. The [reversing-time segmenting number] *number of consecutive occurrences of reversing motions* calculation unit 27 compares the moving amount PA received from the reverse displacement calculation unit 26 with a predetermined moving amount P0. If the moving amount PA is smaller than the predetermined moving amount P0, the [reversing-time segmenting number] *number of consecutive occurrences of reversing motions* calculation unit 27 increases the value N denoting the [reversing-time segmenting number, which is a coefficient indicating a number of segments per unit time during a reversing motion] *number of consecutive occurrences of reversing motions*. If the moving amount PA is equal to or greater than the predetermined moving amount P0, the [reversing-time segmenting number] *number of consecutive occurrences of reversing motions* calculation unit 27 sets 0 as a value of the [reversing-time segmenting number] *number of consecutive occurrences of reversing motions* N. Then, the [reversing-time segmenting number] *number of consecutive occurrences of reversing motions* calculation unit 27 sends the [reversing-time segmenting number] *number of consecutive occurrences of reversing motions* N to the quadrant inversion compensation unit 24. The quadrant inversion compensation unit 24 automatically adjusts a quadrant inversion compensation amount according to the [reversing-time segmenting number] *number of consecutive occurrences of reversing motions* N and performs a quadrant inversion compensation based on the adjusted compensation amount.

The following formula 1 represents an example of a method for increasing and decreasing the quadrant inversion compensation amount that can be performed by the quadrant inversion compensation unit 24 according to the present embodiment. The quadrant inversion compensation unit 24 determines the TFF amount and the TFF continuation time, according to the formula 1, based on an amplification rate of TFF (A), an increment rate of TFF that determines a TFF increment amount per short reversing motion (B), an amplification rate of the TFF continuation time (C), an increment rate of TFF continuation time that determines an increment amount of the TFF continuation time per short reversing motion (D), and the [reversing-time segmenting number] *number of consecutive occurrences of reversing motions* (N).

$$M=M(0)\times A\hat{}(1-e\hat{}(-1\times N\div B))$$

$$T=T(0)\times C\hat{}(1-e\hat{}(-1\times N\div D)) \quad \text{(Formula 1)}$$

M: TFF amount
T: TFF continuation time
M(0): conventional TFF amount
T(0): conventional TFF continuation time
A: amplification rate of TFF
B: increment rate of TFF
C: amplification rate of TFF continuation time
D: increment rate of TFF continuation time
N: [reversing-time segmenting number] *the number of consecutive occurrences of reversing motions*

Figure 2:
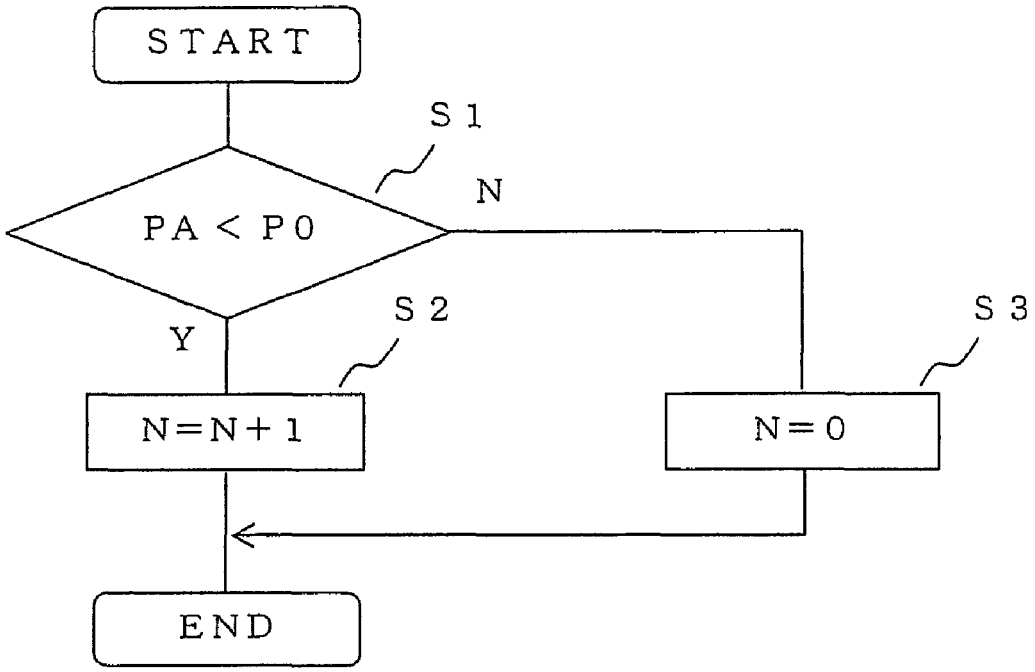
FIG. 2 is a flowchart illustrating an example of processing according to an embodiment of the present invention.

FIG. 2 is a flowchart illustrating an example operation performed by the [reversing-time segmenting number] *number of consecutive occurrences of reversing motions* calculation unit 27 according to the present embodiment. In step S1, the [reversing-time segmenting number] *number of consecutive occurrences of reversing motions* calculation unit 27 compares the moving amount PA received from the reverse displacement calculation unit 26 with the predetermined moving amount (i.e., short reversing amount) P0. If it is determined that the moving amount PA is smaller than the short reversing amount P0, the [reversing-time segmenting number] *number of consecutive occurrences of reversing motions* calculation unit 27 increases the value of the number N by an increment of 1 at step S2. However, if it is determined that the moving amount PA is greater than or equal to the short reversing amount P0, the [reversing-time segmenting number] *number of consecutive occurrences of reversing motions* calculation unit 27 sets the value N to zero at step S3.

Figure 3:
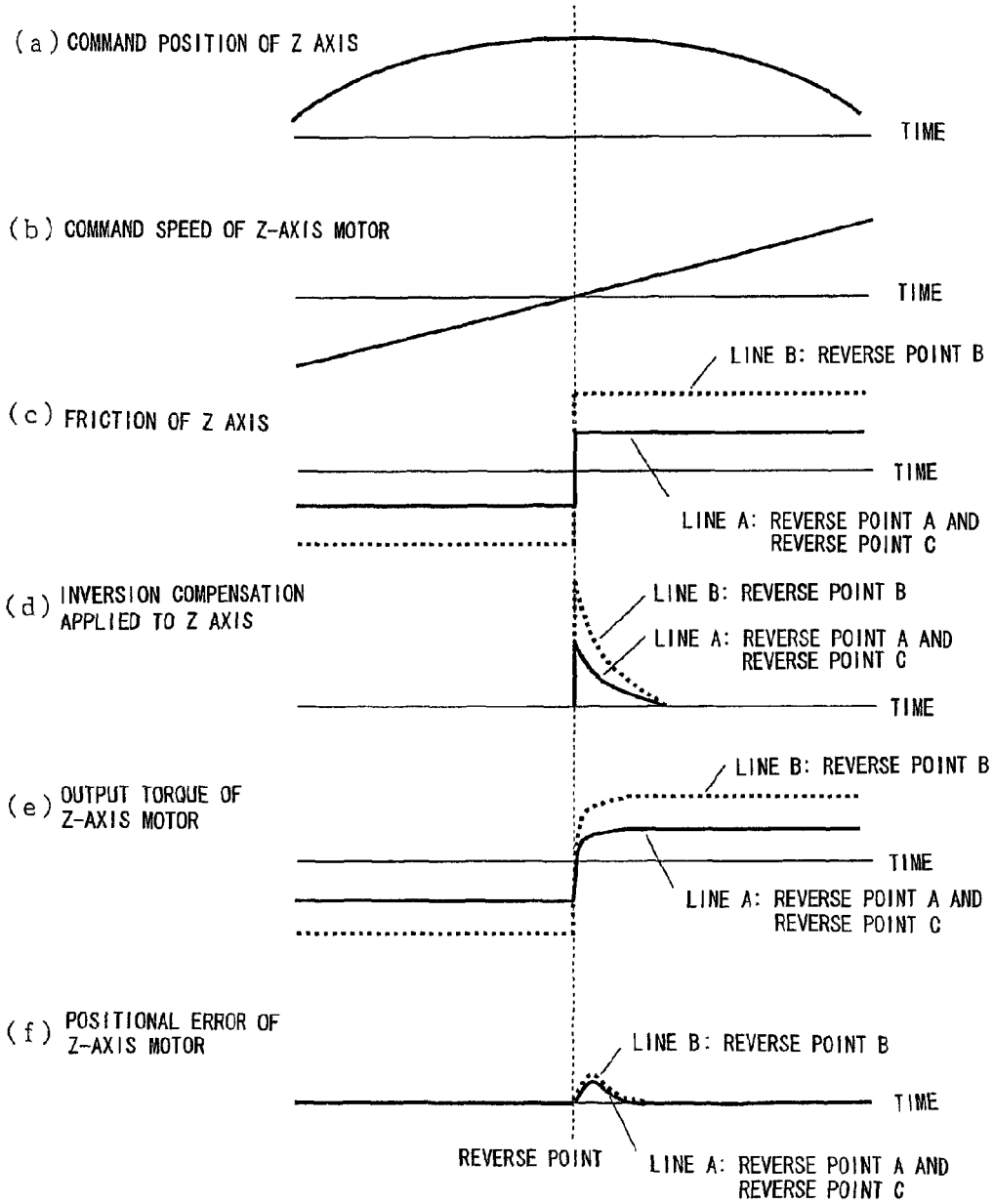
FIG. 3 illustrates an effect of the present invention.
Figure 4:
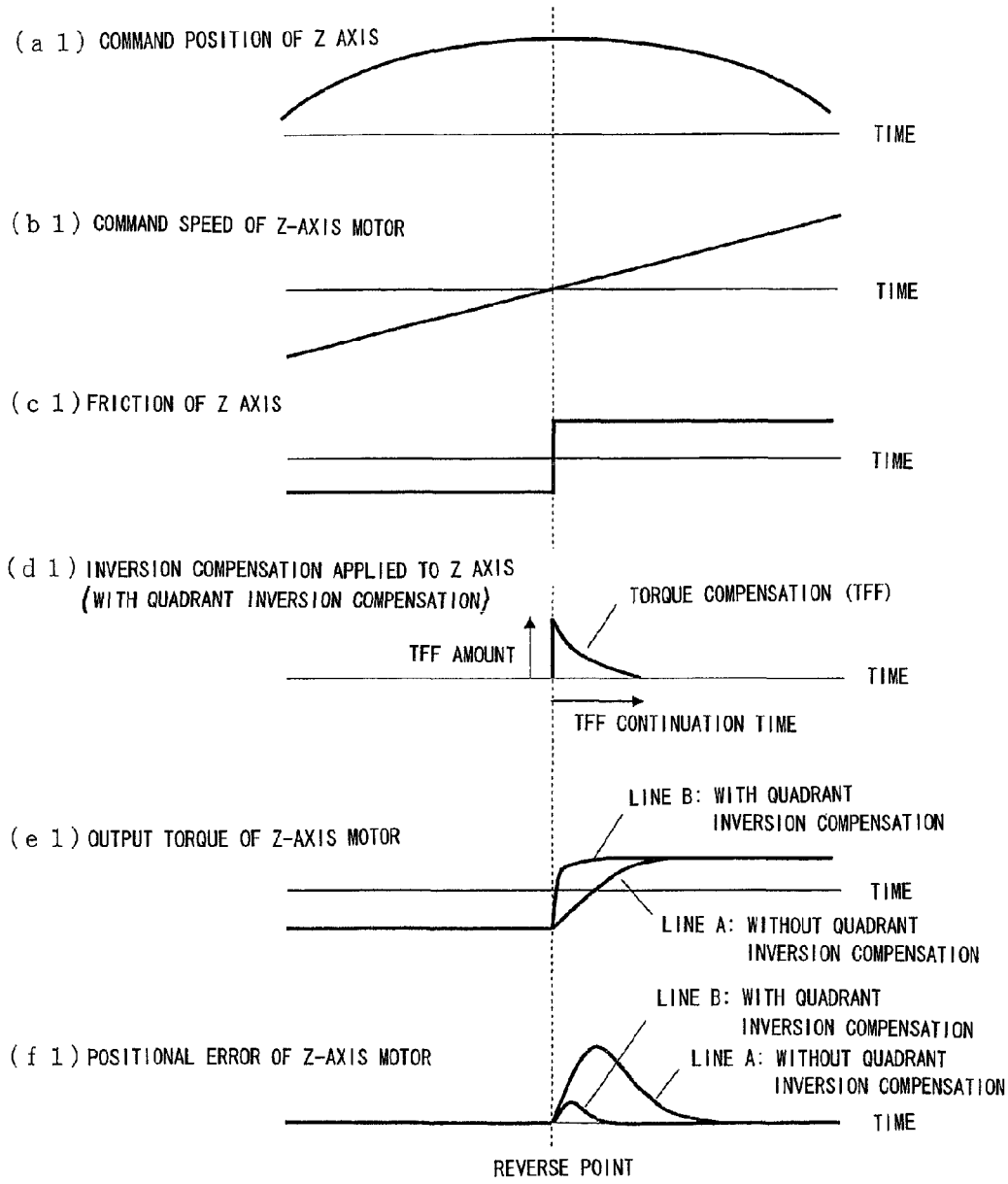
FIG. 4 illustrates an effect of quadrant inversion compensation.
Figure 6:
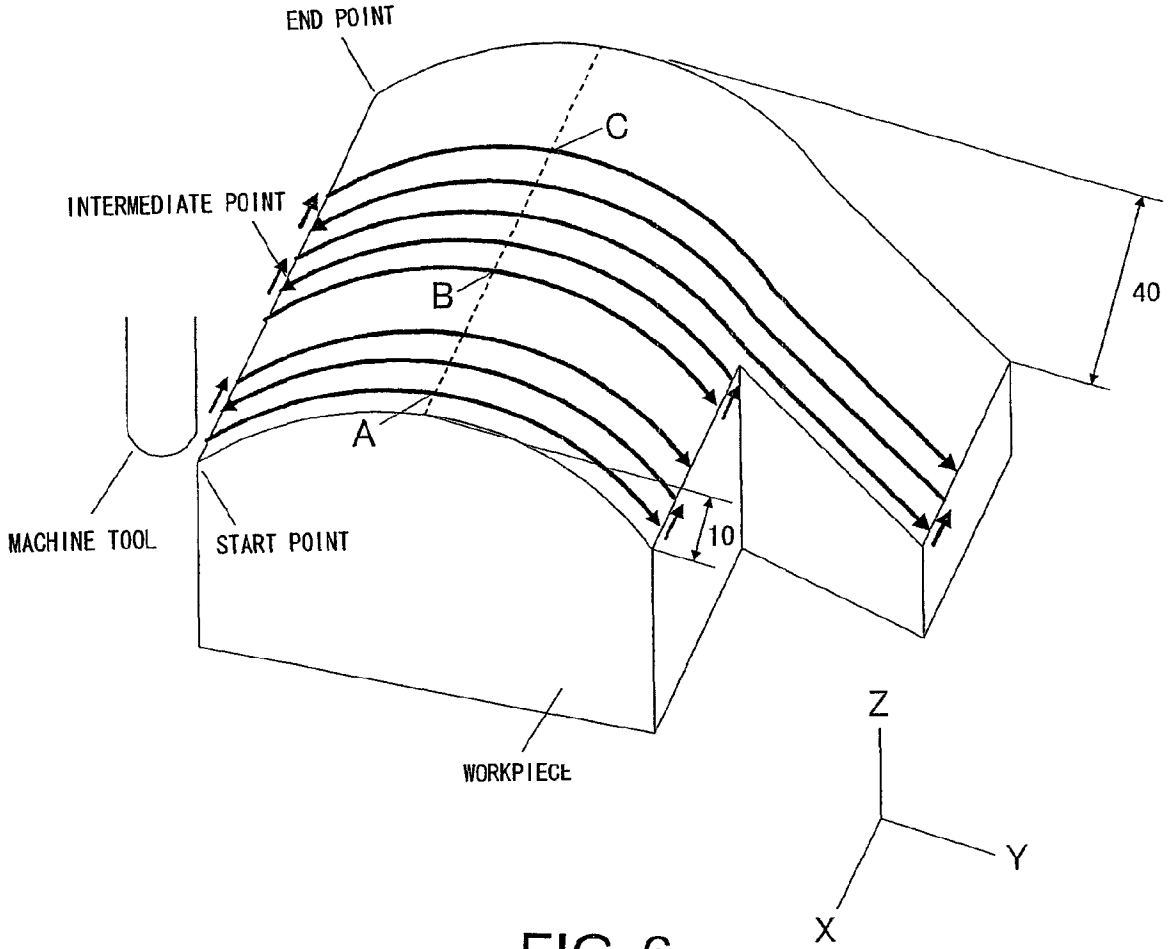
FIG. 6 illustrates an example of a workpiece to be processed.

An example operation according to the present embodiment performed to process a workpiece having the shape illustrated in FIG. 6 is described below with reference to FIG. 3. FIG. 3 illustrates variations in command position of the Z axis (a), command speed of the Z-axis motor (b), friction of the Z axis (c), inversion compensation applied to the Z axis (d), output torque of the Z-axis motor (e), and positional error of the Z-axis motor (f). The quadrant inversion compensation unit 24 increases and decreases the quadrant inversion compensation amount according to a method defined by the following formula 2.

$$M=M(0)\times 2\hat{}(1-e\hat{}(-1\times N\div 10))$$

$$T=T(0)\times 1\hat{}(1-e\hat{}(-1\times N\div 10)) \quad \text{(Formula 2)}$$

M: TFF amount
T: TFF continuation time
M(0): conventional TFF amount
T(0): conventional TFF continuation time
N: reversing-time segmenting number As illustrated in FIG. 3, according to the embodiment of the present invention, the TFF amount at the reverse point B is larger than the TFF amounts at the reverse points A and C, as indicated by a line B of (d). Therefore, the response delay of the output torque of the Z-axis motor relative to the friction of the Z axis can be minimized as indicated by a line B of (e) Accordingly, the positional error of the Z-axis motor at the reverse point B is comparable to the errors at the reverse points A and B, as indicated by lines A and B of (f).

As described above, the quadrant inversion compensation according to the present embodiment can appropriately correct the inversion compensation amount according to the [reversing-time segmenting number] *number of consecutive occurrences of reversing motions* when the machine makes reversing motions repetitively and the moving amount from one reverse point to another reverse point is too short to decrease the friction. Therefore, the position control apparatus according to the present invention can prevent generation of correction errors due to external factors and can continuously perform optimum quadrant inversion compensation. As a result, a processing machine according to the present invention can perform processing accurately without causing any significant tracking error.

What is claimed is:

1. A position control apparatus that performs quadrant inversion compensation when an axial moving direction of a machine is reversed, comprising:

*a control unit comprising:* a reverse displacement calculation unit configured to calculate a reverse displacement that represents an amount of movement made from a preceding reverse point to a current reverse point by an axis that performs a reversing motion;

a [reversing-time segmenting number] *number of consecutive occurrences of reversing motions* calculation unit configured to compare the reverse displacement to a predetermined value, and, when the reverse displacement is less than the predetermined value, increase a value of a [reversing-time segmenting] number *of consecutive occurrences of reversing motions*, [which is a coefficient indicating a number of segments per unit time during a reversing motion,] and, when the reverse displacement is greater than or equal to the predetermined value, decrease the value of the [reversing-time segmenting number] *number of consecutive occurrences of reversing motions*; and a quadrant inversion compensation unit configured to automatically adjust a quadrant inversion compensation amount according to the [reversing-time segmenting number] *number of consecutive occurrences of reversing motions*, and perform the quadrant inversion compensation based on the automatically adjusted compensation amount.

*2. A method for performing quadrant inversion compensation in a machine tool for processing a workpiece, the method comprising:*

*calculating, by a control unit (MCU), a reverse displacement that represents an amount of movement made from a preceding reverse point to a current reverse point by an axis of the machine tool that performs a reversing motion;*

*comparing, by the MCU, the reverse displacement to a predetermined value, and, when the reverse displacement is less than the predetermined value, increasing a value of a number of consecutive occurrences of reversing motions, and, when the reverse displacement is greater than or equal to the predetermined value, decreasing the value of the number of consecutive occurrences of reversing motions;*

*automatically adjusting, by the MCU, a quadrant inversion compensation amount according to the number of consecutive occurrences of reversing motions; and*

*performing, by the MCU, the quadrant inversion compensation based on the automatically adjusted compensation amount.*

* * * * *

UNITED STATES PATENT AND TRADEMARK OFFICE

CERTIFICATE OF CORRECTION

PATENT NO. : RE45,693 E
APPLICATION NO. : 13/735624
DATED : September 29, 2015
INVENTOR(S) : Masaya Minamide It is certified that error appears in the above-identified patent and that said Letters Patent is hereby corrected as shown below:

On the Title page, in the Abstract (57):

At line number 5, the words "a [reversing-time segmenting number] *number of consecutive occurrences of reversing motions*" should read -- a *number of consecutive occurrences of reversing motions* [reversing-time segmenting number] --.

At line number 15, the words "of the [reversing-time segmenting number] *number of consecutive occurrences of reversing motions*" should read -- of the *number of consecutive occurrences of reversing motions* [reversing-time segmenting number] --.

At line number 19, the words "to the [reversing-time segmenting number] *number of consecutive occurrences of reversing motions*" should read -- to the *number of consecutive occurrences of reversing motions* [reversing-time segmenting number] --.

In the Specification:

At column 4, line number 12, the words "value of the [reversing-time segmenting number] *number of consecutive occurrences of reversing motions*" should read -- value of the *number of consecutive occurrences of reversing motions* [reversing-time segmenting number] --.

At column 4, line number 23, the words "according to the [reversing-time segmenting number] *number of consecutive occurrences of reversing motions*" should read -- according to the *number of consecutive occurrences of reversing motions* [reversing-time segmenting number] --.

Signed and Sealed this
Ninth Day of August, 2016

Michelle K. Lee

Michelle K. Lee
*Director of the United States Patent and Trademark Office*

At column 5, line number 2, "a [reversing-time segmenting number] *number of consecutive occurrences of reversing motions*" should read -- *a number of consecutive occurrences of reversing motions* [reversing-time segmenting number] --.

At column 5, line number 11, "to the [reversing-time segmenting number] *number of consecutive occurrences of reversing motions*" should read -- to the number of consecutive occurrences of reversing motions [reversing-time segmenting number] --.

At column 5, line number 13, "The [reversing-time segmenting number] *number of consecutive occurrences of reversing motions*" should read -- The *number of consecutive occurrences of reversing motions* [reversing-time segmenting number] --.

At column 5, line number 19, "the [reversing-time segmenting number] *number of consecutive occurrences of reversing motions*" should read -- the *number of consecutive occurrences of reversing motions* [reversing-time segmenting number] --.

At column 5, line number 21, "denoting the [reversing-time segmenting number, which is a coefficient indicating a number of segments per unit time during a reversing motion] *number of consecutive occurrences of reversing motions.*" should read -- denoting the *number of consecutive occurrences of reversing motions* [reversing-time segmenting number, which is a coefficient indicating a number of segments per unit time during a reversing motion]. --.

At column 5, line number 26, "the [reversing-time segmenting number] *number of consecutive occurrences of reversing motions*" should read -- the *number of consecutive occurrences of reversing motions* [reversing-time segmenting number] --.

At column 5, line number 28, "value of the [reversing-time segmenting number] *number of consecutive occurrences of reversing motions* N" should read -- value of the number *of consecutive occurrences of reversing motions* [reversing-time segmenting number] N. --.

At column 5, line number 30, "Then the [reversing-time segmenting number] *number of consecutive occurrences of reversing motions*" should read -- Then the *number of consecutive occurrences of reversing motions* [reversing-time segmenting number] --.

At column 5, line number 32, "sends the [reversing-time segmenting number] *number of consecutive occurrences of reversing motions* N" should read -- sends the *number of consecutive occurrences of reversing motions* [reversing-time segmenting number] N --.

At column 5, line number 37, "to the [reversing-time segmenting number] *number of consecutive occurrences of reversing motions* N" should read -- to the *number of consecutive occurrences of reversing motions* [reversing-time segmenting number] N --.

At column 5, line number 53, "and the [reversing-time segmenting number] *number of consecutive occurrences of reversing motions* (N)" should read -- and the *number of consecutive occurrences of reversing motions* [reversing-time segmenting number] (N). --.

At column 6, line number 1, "N: [reversing-time segmenting number] the *number of consecutive occurrences of reversing motions*" should read -- N: the *number of consecutive occurrences of reversing motions* [reversing-time segmenting number] --.

At column 6, line number 4, "performed by the [reversing-time segmenting number] *number of consecutive occurrences of reversing motions*" should read -- performed by the *number of consecutive occurrences of reversing motions* [reversing-time segmenting number] --.

At column 6, line number 7, "the [reversing-time segmenting number] *number of consecutive occurrences of reversing motions*" should read -- the *number of consecutive occurrences of reversing motions* [reversing-time segmenting number] --.

At column 6, line number 13, "the [reversing-time segmenting number] *number of consecutive occurrences of reversing motions*" should read -- the *number of consecutive occurrences of reversing motions* [reversing-time segmenting number] --.

At column 6, line number 18, "the [reversing-time segmenting number] *number of consecutive occurrences of reversing motions*" should read -- the *number of consecutive occurrences of reversing motions* [reversing-time segmenting number] --.

At column 6, line number 53, "[reversing-time segmenting number] *number of consecutive occurrences of reversing motions*" should read -- *number of consecutive occurrences of reversing motions* [reversing-time segmenting number]

In the Claims:

At column 7, line number 7, claim 1, the words "a [reversing-time segmenting number] *number of consecutive occurrences of reversing motions*" should read -- a *number of consecutive occurrences of reversing motions* [reversing-time segmenting number] --.

At column 7, line number 18, claim 1, the words "of the [reversing-time segmenting number] *number of consecutive occurrences of reversing motions*" should read -- of the *number of consecutive occurrences of reversing motions* [reversing-time segmenting number] --.

At column 7, line number 22, claim 1, the words "to the [reversing-time segmenting number] *number of consecutive occurrences of reversing motions*" should read -- to the *number of consecutive occurrences of reversing motions* [reversing-time segmenting number] --.